United States Patent
You et al.

(10) Patent No.: US 10,372,148 B2
(45) Date of Patent: Aug. 6, 2019

(54) POWER SYSTEM DISTURBANCE LOCATION DETERMINATION BASED ON RATE OF CHANGE OF FREQUENCY

(71) Applicant: University of Tennessee Research Foundation, Knoxville, TN (US)

(72) Inventors: Shutang You, Knoxville, TX (US); Dao Zhou, Knoxville, TN (US); Ling Wu, Knoxville, TN (US); Yilu Liu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 258 days.

(21) Appl. No.: 15/353,341

(22) Filed: Nov. 16, 2016

(65) Prior Publication Data

US 2018/0136684 A1    May 17, 2018

(51) Int. Cl.
*G05F 1/66* (2006.01)
*G05B 19/048* (2006.01)

(52) U.S. Cl.
CPC ............. *G05F 1/66* (2013.01); *G05B 19/048* (2013.01); *G05B 2219/31356* (2013.01)

(58) Field of Classification Search
CPC .............. G05F 1/66; G05B 19/048; G05B 2219/31356
See application file for complete search history.

(56) References Cited

U.S. PATENT DOCUMENTS

| 5,481,649 | A | * | 1/1996 | Birdwell | G05B 13/028 700/49 |
| 7,519,454 | B2 | | 4/2009 | Gardner et al. | |
| 7,633,284 | B2 | * | 12/2009 | Ingram | H02J 7/0019 320/167 |
| 9,281,689 | B2 | * | 3/2016 | Boardman | H02J 3/26 |
| 10,024,897 | B2 | * | 7/2018 | Liu | G01R 25/00 |
| 2012/0316691 | A1 | * | 12/2012 | Boardman | H02J 3/26 700/293 |
| 2016/0179120 | A1 | * | 6/2016 | Boardman | H02J 3/26 700/295 |

(Continued)

OTHER PUBLICATIONS

Zuo et al., "Use of Frequency Oscillations to Improve Event Location Estimation in Power Systems", Power Engineering Society General Meeting, Jun. 24, 2007, IEEE, pp. 1-7.

(Continued)

*Primary Examiner* — Laura M Menz
(74) *Attorney, Agent, or Firm* — Myers Bigel, P.A.

(57) ABSTRACT

A method for determining a location of a disturbance in a power system is provided. The method includes receiving data from a plurality of sensors distributed across the power system; determining, with one or more processors, for each sensor, an extremum of the data corresponding to the sensor; interpolating, with the one or more processors, the extrema; and presenting, on one or more display units, a location corresponding to a global maximum of the interpolated extrema as the location of the disturbance. The method may further include, if a difference between the largest extremum and each of remaining extremum is greater than a predetermined threshold, skipping the interpolating step and the presenting step, and presenting a location of the sensor corresponding to the largest extremum as the location of the disturbance.

12 Claims, 6 Drawing Sheets

(56) References Cited

U.S. PATENT DOCUMENTS

2017/0046458 A1\* 2/2017 Meagher ............... H02J 13/001
2018/0136684 A1\* 5/2018 You ........................... G05F 1/66

OTHER PUBLICATIONS

Gardner et al., "Power System Event Location Analysis Using Wide-Area Measurements", Power Engineering Society General Meeting, Jun. 18-22, 2006, IEEE, pp. 1-7.

Xia et al., "Phase angle-based power system inter-area oscillation detection and modal analysis", European Transactions on Electrical Power 2011; 21:1629-1639 (published online Nov. 9, 2010 in Wiley Online Library, wileyonlinelibrary.com).

Li et al., "Wide Area Synchronized Measurements and Inter-Area Oscillation Study", Power Systems Conference and Exposition, Mar. 15-18, 2009, IEEE, pp. 1-8.

\* cited by examiner

US 10,372,148 B2

POWER SYSTEM DISTURBANCE LOCATION DETERMINATION BASED ON RATE OF CHANGE OF FREQUENCY

STATEMENT REGARDING FEDERALLY SPONSORED RESEARCH OR DEVELOPMENT

This invention was made with government support under EEC-1041877 awarded by the U.S. National Science Foundation and the U.S. Department of Energy. The U.S. Government has certain rights in this invention.

BACKGROUND

The present disclosure generally relates to electric power systems and determining disturbance location in electric power systems.

Electric power systems, also known as power grids, typically include generators, transmission lines, and loads, among other electrical components. Although power grids are relatively robust systems under most operating conditions, various kinds of disturbances may impact their reliability. If power grids are not properly monitored, protected, and/or controlled, some of these disturbances may cause failures and eventually lead to blackouts. Quickly and accurately determining the locations of disturbances in power grids may improve operators' situational awareness of the power grids. Informed of the location of a disturbance, operators may better implement remedy plans to mitigate the impact of the disturbance and restore the system to a secure state.

Recent developments in synchrophasor measurement technology and wide-area measurement systems (WAMS) have provided an advanced platform for locating disturbances. In WAMS, phasor measurement units (PMUs) monitor system voltage and current phasors using high-precision synchronized time information, thus capturing fast dynamics of system states, which may be used for disturbance analyses. Existing methods that use PMU data to locate disturbances usually include two steps-determining arrival times of a plurality of PMUs to a disturbance and then estimating the location of the disturbance.

Most of the existing methods determine arrival times of PMUs as times at which frequency measurements at the PMUs exceed a threshold. These methods require setting a frequency threshold $\bar{f}$ to track the frequency change $\Delta f$. However, since frequency is the integral of the generation-load imbalance caused by a disturbance (i.e., $$\Delta f = \int_{t_0}^{t_1} \frac{P_m(t) - P_e(t)}{2H} dt,$$

where H is the inertia constant of the system), the determined arrival times may be very sensitive to the setting of the frequency threshold $\bar{f}$. A frequency threshold $\bar{f}$ that is too small may make the arrival times vulnerable to noise. A frequency threshold $\bar{f}$ that is too large may produce incorrect arrival times due to system oscillation, since frequency profiles may cross over one another in oscillations.

To estimate the disturbance location, the methods then typically employ a least-square disturbance location approach, with the assumption that the propagation speed of an electromechanical wave, which is generated by the disturbance and which propagates outwards from the disturbance location, is constant throughout the power grid. In fact, the propagation speed varies widely throughout the power grid due to system conditions such as unit commitment and load dynamics, thus making it difficult to apply these methods in practice to locate the disturbance location.

Other methods combine measurements with power grid models to locate generator trips. However, these methods rely on the power grid models in calculating the propagation distance, and thus cannot be applied when the grid models are not available or the system topologies change with operation conditions.

Therefore, the inventors recognized a need in the art for systems and methods for accurately and reliably determining the location of a disturbance in an electric power system.

DETAILED DESCRIPTION

Figure 1:
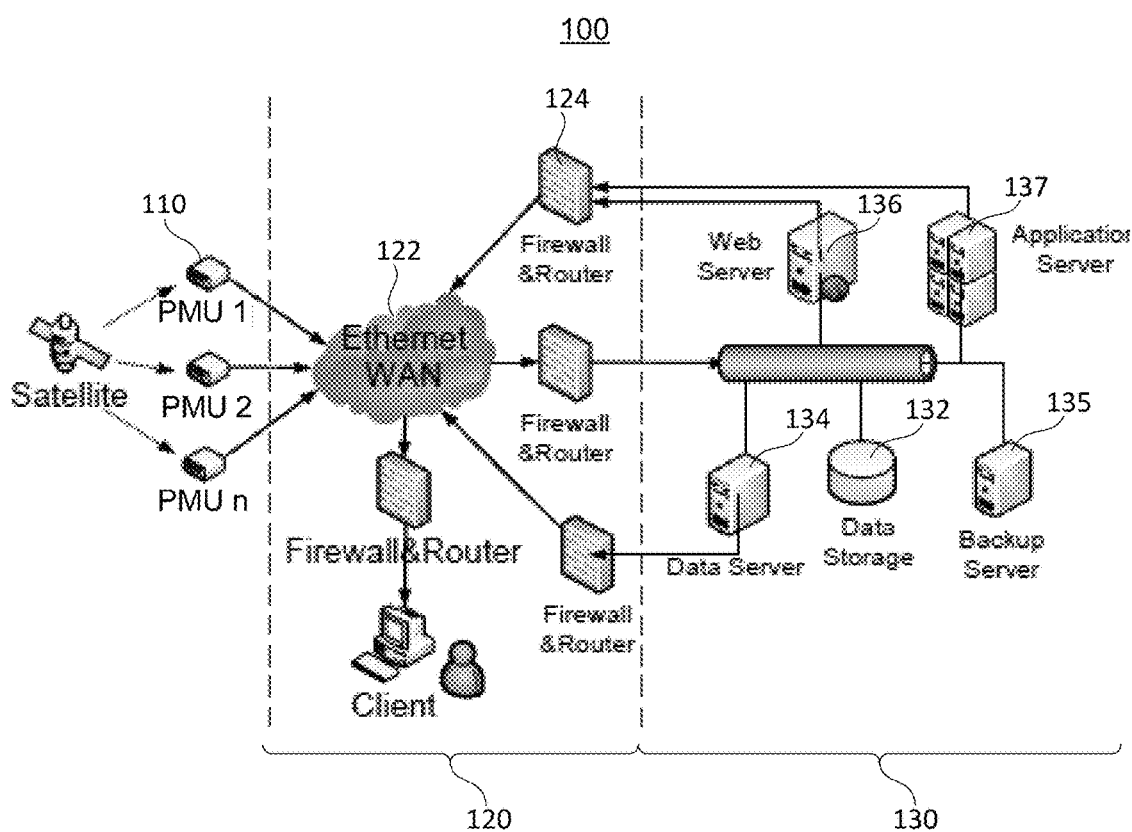
FIG. 1 illustrates an exemplary framework of a monitoring network for a power grid, according to an embodiment of the present disclosure.

As discussed in the Background section, a disturbance in a power grid generally induces a disturbance in the frequency of the power grid. Starting at the location of the disturbance, the frequency disturbance propagates as an electromechanical wave at finite speeds in the power grid. The frequency disturbance thus may be recorded at a plurality of phasor measurement units (PMUs), which are typically sparsely distributed across the power grid. As used herein, a PMU may generally include any device that can measure frequency at any point in the power grid.

In the present disclosure, an extremum of rate of change of frequency (ROCOF) is used to indicate the distance between the location of a disturbance and a location of a PMU. From high-precision voltage and/or current measurements, each PMU is configured to determine the ROCOF, which is a physical attribute usually used to represent acceleration and deceleration of rotor angles of generators, and which is a good indicator of the impact of the electromechanical wave generated by the disturbance. The PMUs may transmit their ROCOF data to one or more servers, where sudden variations in frequency may be readily detected from the ROCOF data. Unlike the use of frequency data, the adoption of ROCOF facilitates fast, accurate, and robust determination of the relative distances between the location of the disturbance and the locations of the PMUs, forming the basis for determining the location of the disturbance. The ROCOF extrema for the PMUs are compared. If one PMU has a significantly larger ROCOF extremum (in absolute value) than other PMUs, the location of the one PMU is designated as the estimated location of disturbance.

In situations where multiple PMUs may similar extreme values, which are larger than the remaining PMUs, the present disclosure combines a Delaunay triangulation and a bicubic two-dimensional (2D) interpolation. The Delaunay triangulation ensures that the ROCOF extrema are organized in the spatial domain for their subsequent use in determining the disturbance location. The bicubic 2D interpolation guarantees that interpolated ROCOF extrema are geographically smooth, with little or no interpolation artifacts. Together with the Delaunay triangulation, the bicubic 2D interpolation thus models and constructs a distribution of the ROCOF extrema. The location of the disturbance may then be determined by searching the distribution for a point that has the maximum ROCOF extremum.

An embodiment of the present disclosure provides a method for determining a location of a disturbance in a power system is provided. The method includes receiving data from a plurality of sensors distributed across the power system; determining, with one or more processors, for each sensor, an extremum of the data corresponding to the sensor; interpolating, with the one or more processors, the extrema; and presenting, on one or more display units, a location corresponding to a global maximum of the interpolated extrema as the location of the disturbance. The method may further include, if a difference between the largest extremum and each of remaining extremum is greater than a predetermined threshold, skipping the interpolating step and the presenting step, and presenting a location of the sensor corresponding to the largest extremum as the location of the disturbance.

Another embodiment of the present disclosure provides a system including a power system, a plurality of sensors distributed across the power system, and a computer system including one or more processors, one or more display units, and memory storing instructions adapted to be executed by the plurality of processors to perform operations. The operations includes receiving data from the sensors; determining, for each sensor, an extremum of the data corresponding to the sensor; interpolating the extrema; and presenting, on the one or more display units, a location corresponding to a global maximum of the interpolated extrema as the location of a disturbance in the power system.

FIG. 1 illustrates an exemplary framework of a monitoring network 100 for a power grid, according to an embodiment of the present disclosure. The network 100 may consist of one or more PMUs 110, which may perform local global positioning system (GPS)-synchronized measurements and send data to an information management system (IMS) 130 through the Internet 120. It is to be appreciated that the PMUs 110 are not limited to any particular device, and may refer to any sensor that uses synchrophasor measurement technology. The PMUs 110 are typically sparsely installed to perform the local measurements at different locations across the power grid. The PMUs 110 generally make voltage and current measurements, from which frequency, ROCOF, etc. may be computed either locally or at the IMS 130. The IMS 130 may collect the measured and computed data from the PMUs 110, store the data in databases in data storage devices 132, and provide a platform for analyses of the data either before or after storing the data. The Internet 120 may serve as a wide-area communication network (WAN) 122 with a plurality of firewalls/routers 124 to connect the PMUs 110 to the IMS 130. The servers 134-137 in the IMS 130 may include a plurality of processors to manipulate and analyze the stored data serially and/or in parallel. Data generated from the analyses of the stored data may also be stored in the data storage devices 132. The servers 134-137 may be centrally or distributedly located. The data storage devices 132 may include secondary or tertiary storage to allow for non-volatile or volatile storage of measurements (e.g., frequencies and phase angles) from the PMUs 110. The IMS 130 may be entirely contained at one location or may also be implemented across a closed or local network, an internet-centric network, or a cloud platform.

Figure 2:
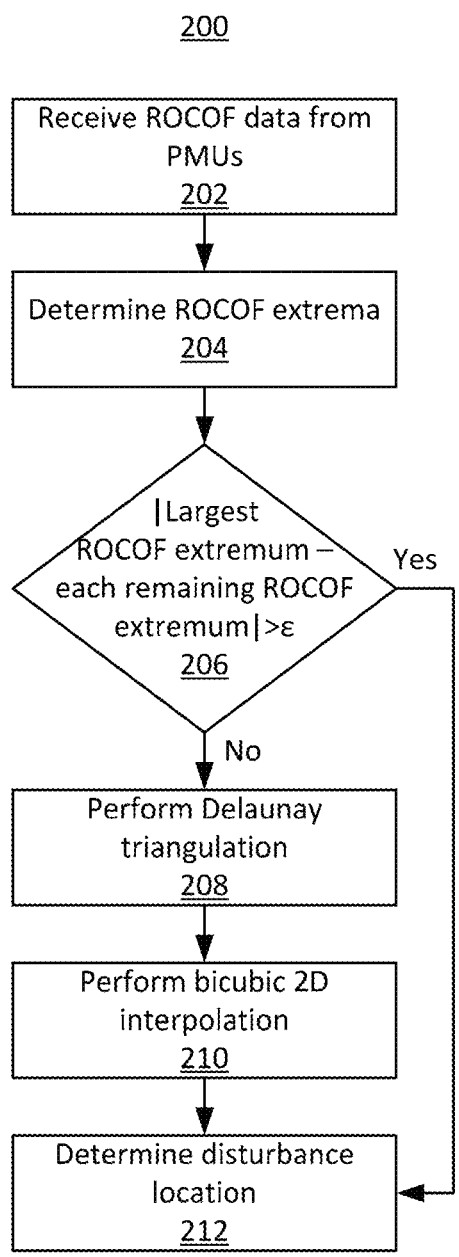
FIG. 2 is a flowchart depicting a method for determining a disturbance location in a power grid according to an embodiment of the present disclosure.
Figure 3:
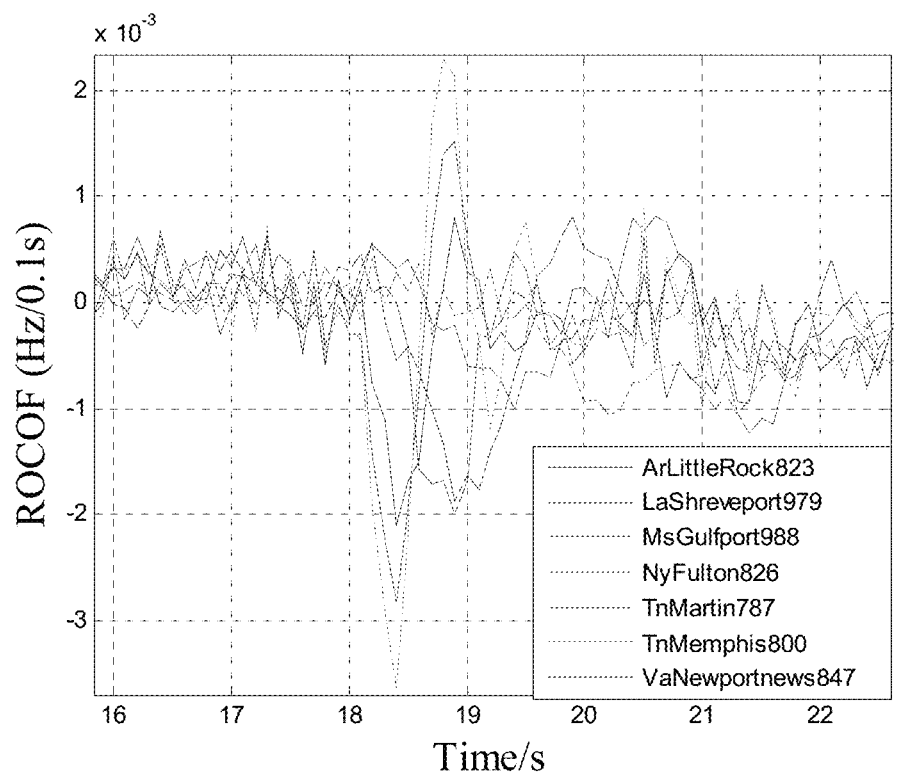
FIG. 3 is a plot of rate of change of frequency (ROCOF) data from a plurality of phasor measurement units (PMUs), following a disturbance, according to an embodiment of the present disclosure.

FIG. 2 is a flowchart depicting a method 200 for determining the location of a disturbance in a power grid according to an embodiment of the present disclosure. The method 200 may be implemented on one or more of the servers 134-137 in the IMS 130. The method 200 starts at step 202, where one or more the servers 134-137 receive ROCOF data from the PMUs 110. The method 200 may align all the received ROCOF data based on their corresponding PMU GPS timestamp. FIG. 3 is a plot of ROCOF data from a plurality of PMUs, following an actual disturbance, according to an embodiment of the present disclosure. The disturbance is a generation trip event that happened close to the border of Arkansas and Tennessee at 23:36:27 (UTC) on Apr. 17, 2015.

At step 204, the method 200 determines the ROCOF extrema from the ROCOF data received at step 202. For example, Table I lists the ROCOF extrema determined for of the PMUs in FIG. 3.

TABLE I

| PMU # | PMU Location | | ROCOF extrema (mHz/0.1 s, in absolute value) |
|---|---|---|---|
| | State | City | |
| 800 | TN | Memphis | 3.65 |
| 787 | TN | Martin | 2.80 |
| 823 | AR | Little Rock | 2.13 |
| 979 | LA | Shreveport | 2.00 |
| 998 | MS | Gulfport | 1.82 |
| 826 | NY | Fulton | 1.06 |
| 847 | VA | Newport News | 0.99 |

At step 206, the method 200 determines the largest ROCOF extremum among all the ROCOF extrema from step 204 and determines whether the largest ROCOF extremum is significantly larger than the each of the remaining ROCOF extrema. For example, the method 200 may determine whether the absolute difference between largest ROCOF extremum and each remaining ROCOF extremum exceeds a predetermined threshold ε. The predetermined threshold ε may be chosen to be a percentage of the largest ROCOF extremum. If the absolute difference between largest ROCOF extremum and each remaining ROCOF extremum exceeds the threshold c, the method 200 proceeds directly to step 212; otherwise, the method 200 proceeds to step 208.

Figure 4:
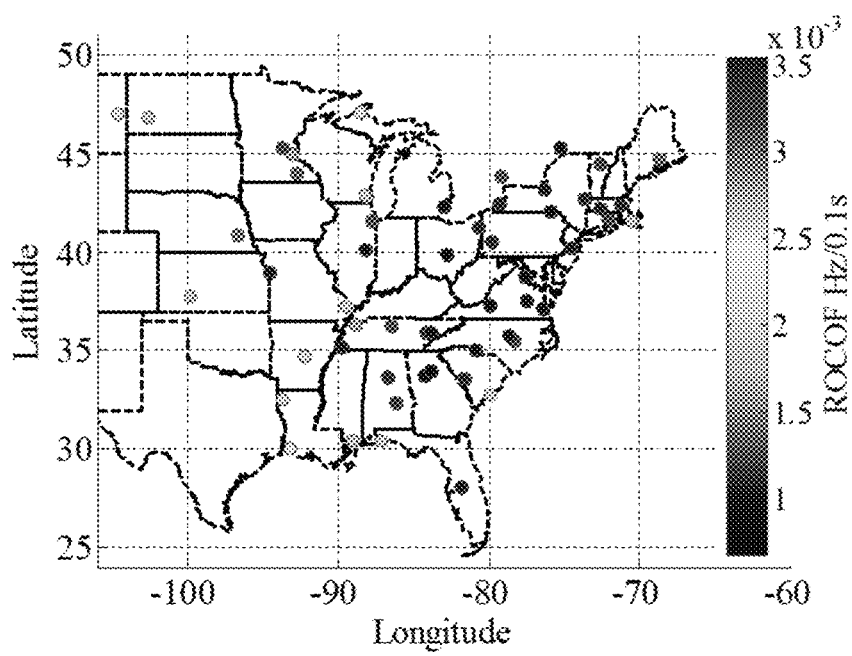
FIG. 4 illustrates an example ROCOF extrema at PMUs according to an embodiment of the present disclosure.
Figure 5:
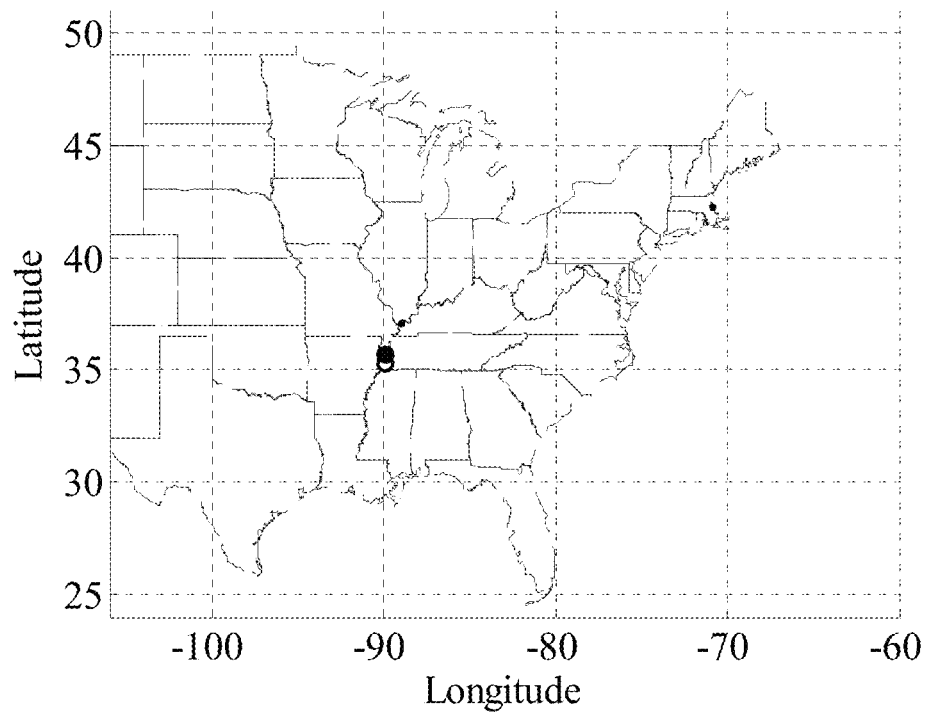
FIG. 5 illustrates the accuracy of the disturbance location determined in FIG. 4.

FIGS. 4 and 5 show the disturbance location determination for the ROCOF data given in FIG. 3, in which the ROCOF extremum of one PMU is significantly larger than the ROCOF extrema of the other PMUs, as listed in Table I. FIG. 4 illustrates the ROCOF extrema for the PMUs on a map, according to an embodiment of the present disclosure. As can be seen in FIG. 4, the PMUs, which are represented by the colored dots, are distributed across the U.S. and, in this case, in the Eastern Interconnect (EI). Red dots represent PMUs with larger ROCOF extrema whereas blue dots represent PMUs with relatively smaller ROCOF extrema. In this scenario, the PMU #800 in Memphis, Tenn., is determined (at step 206) to have the largest ROCOF extremum (i.e., 3.65 mHz/0.1 s). If the threshold ε is chosen to be 20% of this largest ROCOF extremum, for example, then the largest ROCOF extremum corresponding to the PMU #800 is significantly larger than the ROCOF extrema of the other PMUs. Therefore, the method 200 moves to step 212 and designates the PMU #800 as the disturbance location. FIG. 5 illustrates the accuracy of the determined disturbance location compared to the actual location of the disturbance. As can be seen from FIG. 5, the method 200 is relatively accurate in determining the location of a disturbance in this case.

Figure 6:
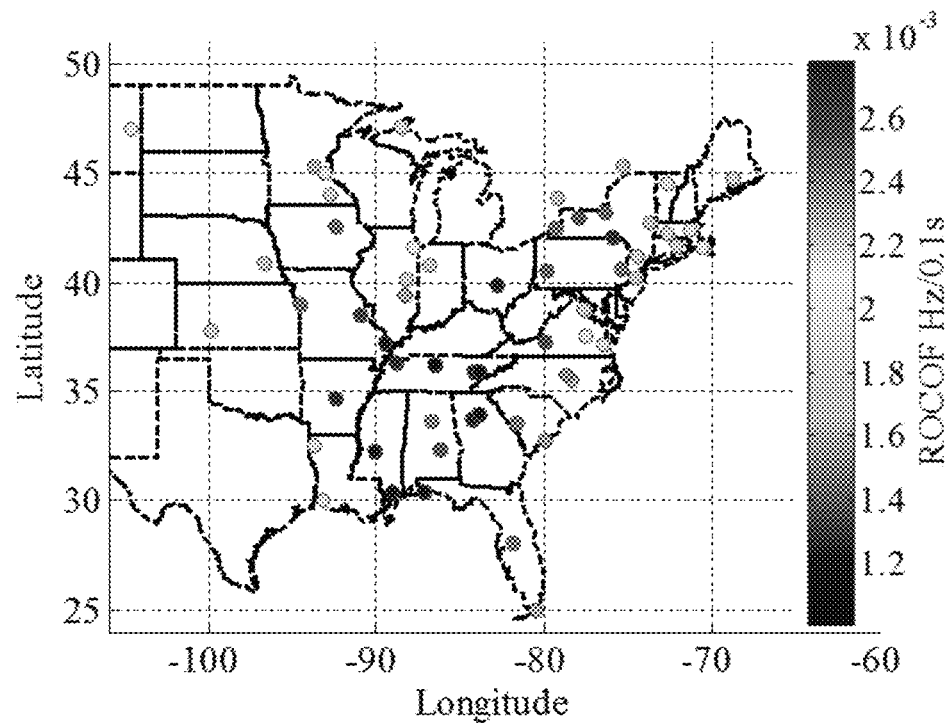
FIG. 6 illustrates an example ROCOF extrema at PMUs according to an embodiment of the present disclosure

FIGS. 6-9 illustrate the disturbance location determination for a generation trip disturbance that happened close to the border of West Virginia and Ohio at 02:37:31 (UTC) on Jan. 1, 2015. FIG. 6 illustrates the ROCOF extrema for the PMUs on the map. In this case, PMUs in multiple states—Ohio, Virginia, and Pennsylvania, for example—had ROCOF extrema that were within a predetermined threshold ε of the largest ROCOF extremum. For instance, the ROCOF extrema corresponding to the three PMUs in these three states were 2.84 mHz/0.1 s, 2.60 mHz/0.1 s, and 2.52 mHz/0.1 s, respectively. The differences between the largest ROCOF extremum and the other ROCOF extrema were within 20% of the largest ROCOF extremum. From FIG. 6, it may be deduced that the disturbance must have originated closer to these three PMUs. Therefore, the disturbance location would be in an area that is close to the three PMU locations and has the maximum ROCOF extremum. However, in the absence of additional PMUs in the neighborhood of these three PMUs, the maximum ROCOF extremum is unknown. To resolve this shortcoming, the present disclosure performs a Delaunay triangulation of the PMU locations to allow for the interpolation of the PMU ROCOF extrema between the PMU locations using a bicubic two-dimensional (2D) interpolation technique to determine the location of the disturbance. Given that this approach is parameter-free, uncertainties from parameter errors are eliminated.

Accordingly, if the method 200 determines at step 206 that multiple PMUs have ROCOF extrema that are within a predetermined threshold of the largest ROCOF extremum, the method 200 proceeds to step 208 to perform a Delaunay triangulation of the PMU locations. The Delaunay triangulation minimizes the maximum angle of all triangulations that connect three PMU locations, allowing for the optimal reconstruction of the ROCOF extrema at locations where no PMU or other type of disturbance sensor is installed. In reality, PMUs may not always be online. For example, some PMUs may go offline for maintenance or may fail. Therefore, the method 200 performs the Delaunay triangulation on PMUs from which ROCOF data is being received.

To perform the Delaunay triangulation, the method 200 starts by forming an area S. Given N PMUs installed at different locations in the power grid, the method 200 indexes each PMU as $PMU_i$ and represents the coordinate of each PMU as $(lon_i, lat_i)$. Thus, the method 200 creates the area S defined by extreme corners, constituting the geographic boundary of all the PMUs. The method 200 then partitions the area S into triangles using the locations of the PMUs in a nearest neighbor manner, ensuring that no PMU is within the circumcircle of a triangle formed by any other three PMUs. An indicator of whether $PMU_i$ is within the triangle formed by the location of another three PMUs ($PMU_A$, $PMU_B$, $PMU_C$) is the determinant of the following matrix:

$$M_{i-A,B,C} = \begin{vmatrix} lon_A - lon_i & lat_A - lat_i & (lon_A^2 - lon_i^2) + (lat_A^2 - lat_i^2) \\ lon_B - lon_i & lat_B - lat_i & (lon_B^2 - lon_i^2) + (lat_B^2 - lat_i^2) \\ lon_C - lon_i & lat_C - lat_i & (lon_C^2 - lon_i^2) + (lat_C^2 - lat_i^2) \end{vmatrix} \quad (1)$$

Figure 7:
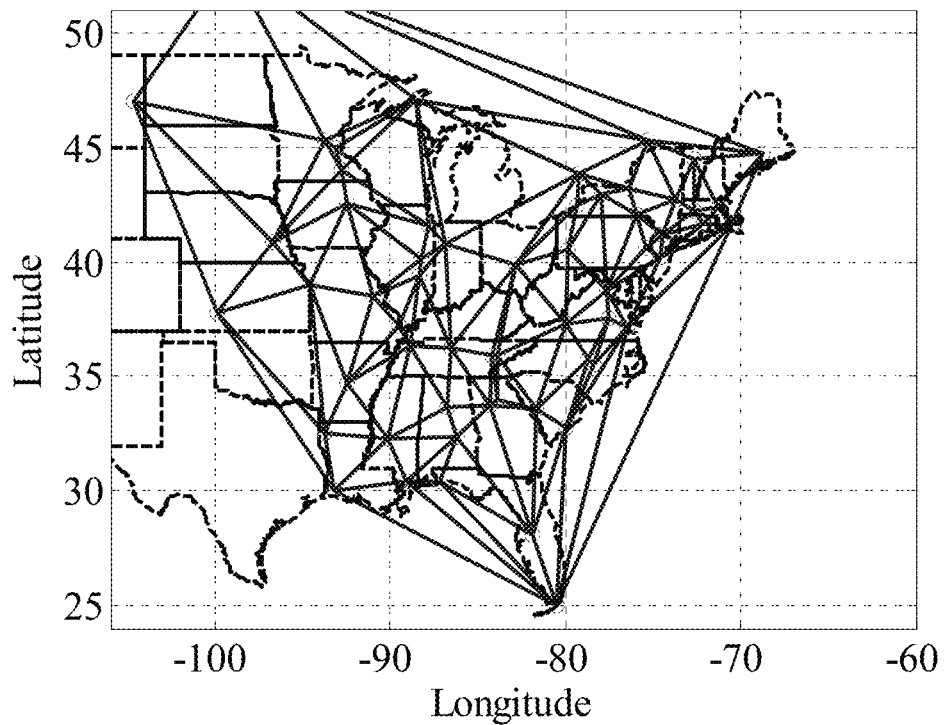
FIG. 7 illustrates an exemplary spatial Delaunay triangulation of PMU locations according to an embodiment of the present disclosure.

At step 208, the method 200 also partitions the area S in the longitude direction and the latitude direction to generate a mesh grid. With the unit between adjacent partitions being u, the longitude side has $N_O=(lon_{max}-lon_{min})/u$ partitions, while the latitude side has $N_A=(lat_{max}-lat_{min})/u$ partitions. Thus, a mesh grid with $N_O \times N_A$ points is created. FIG. 7 illustrates an exemplary spatial Delaunay triangulation of the PMU locations, according to an embodiment of the present disclosure.

At step 210, following the Delaunay triangulation, the method 200 performs the bicubic 2D interpolation of the ROCOF extrema. The bicubic 2D interpolation computes a two-dimensional cubic function to fit the triangulated ROCOF extrema at scattered points. For $[lon_1, lon_2, \ldots, lon_N]$ and $[lat_1, lat_2, \ldots, lat_N]$. The interpolated ROCOF extremum at each point of the mesh grid within the area S has the following form:

$$\text{ROCOF\_extremum}(lon, lat) = \sum_{u=0}^{3}\left(\sum_{v=0}^{3} a_{j,k}^{(u,v)}(lon - lon_j)^u (lat - lat_k)^v\right) \quad (2)$$

Figure 8:
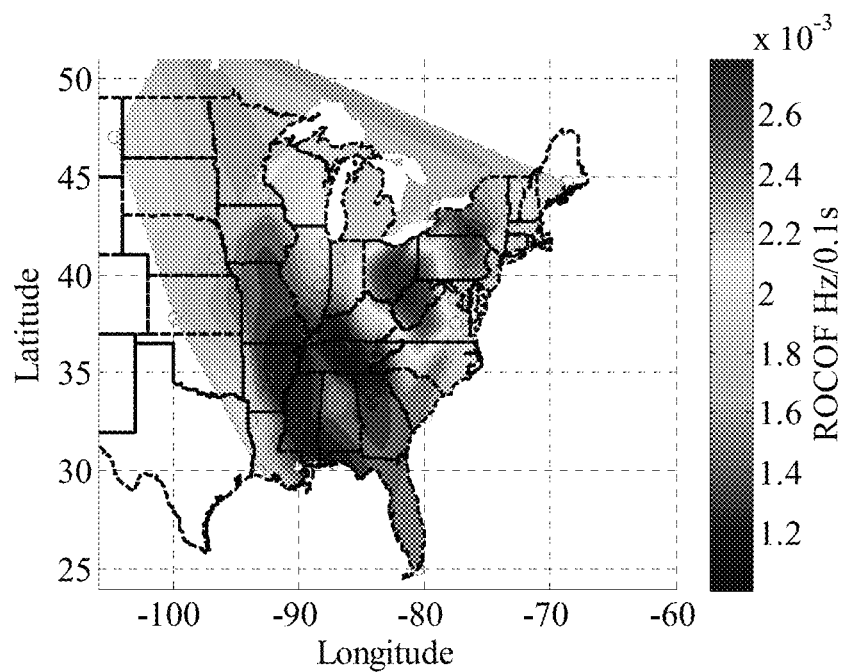
FIG. 8 illustrates an exemplary contour map of interpolated ROCOF extrema according to an embodiment of the present disclosure.

FIG. 8 illustrates an exemplary contour map of ROCOF extrema resulting from the bicubic 2D interpolation of the ROCOF extrema determined in step 204, according to an embodiment of the present disclosure. The red areas in FIG. 8 show the locations with larger ROCOF extrema, indicating locations near the disturbance, whereas the blue areas represent significantly smaller ROCOF extrema.

Figure 9:
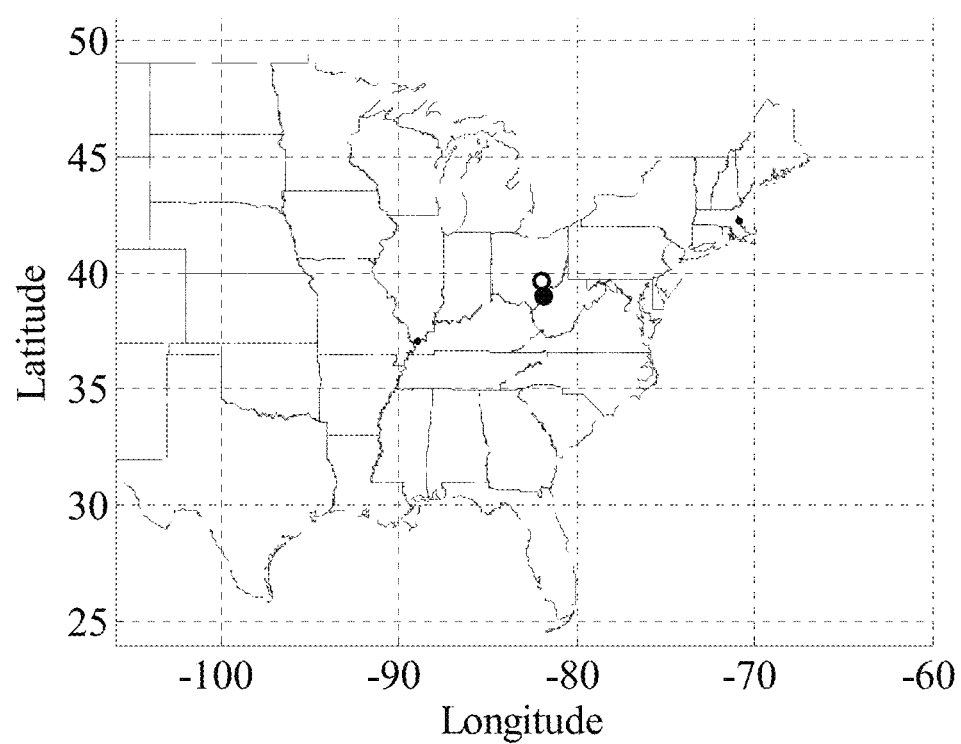
FIG. 9 illustrates the accuracy of the disturbance location determined in FIG. 8.

At step 210, the method 200 scans all the points in the mesh grid for the point that has the global maximum ROCOF extremum and designates this point as the location of the disturbance. The determined disturbance location may be denoted as $(lon_{event}, lat_{event})$. FIG. 9 depicts the determination of the disturbance location from the contour of FIG. 8, according to an embodiment of the present disclosure. FIG. 9 illustrates the accuracy of the determined disturbance location compared to the actual location of the disturbance. As can be seen from FIG. 9, the method 200 is relatively accurate in determining the location of a disturbance. In this scenario, the determined disturbance location is more accurate compared to simply using the location of the PMU with the largest ROCOF extremum.

It is to be appreciated that the implementation of the method 200 is not limited to any particular programming language or execution environment, and the method 200 may be applied to any computer programming languages or logic. Also, although not explicitly shown in FIG. 1, the IMS 130 may include one or more display units to display one or more of the outcomes (e.g., contour of ROCOF extrema and determined location of a disturbance) of the method 200 for review and analysis by operators of the power grid. As such, in an event of a disturbance, the operators may be quickly (within seconds or sub-seconds) informed of the location of the disturbance and may readily implement remedy plans to mitigate the impact of the disturbance and restore the system to a secure state. For example, knowing the location of the disturbance, the operators may determine whether the disturbance involves one or more of a generator, a transmission line, a substation, etc., and may thus decide whether to control the generator, open one or more switches/breakers, etc.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure. Further variations are permissible that are consistent with the principles described above.

What is claimed is:

1. A method for determining a location of a disturbance in a power system, comprising:
   receiving data from a plurality of sensors distributed across the power system;
   determining, with one or more processors, for each sensor, an extremum of the data corresponding to the sensor;
   interpolating, with the one or more processors, the extrema;
   determining a location corresponding to a global maximum of the interpolated extrema as the location of the disturbance; and
   modifying an operation of at least one element in the power system to mitigate an impact of the disturbance on the power system based on the location of the disturbance.

2. The method of claim 1, wherein the data is rate of change of frequency (ROCOF) data.

3. The method of claim 1, further comprising, prior to the determining the extremum of the data, taking the absolute of the data.

4. The method of claim 1, further comprising, prior to the interpolating the extrema:
   determining a largest extremum among the extrema;
   determining differences between the largest extremum and each of the remaining extrema; and
   if each of the differences is greater than a predetermined threshold, skipping the interpolating and the determining the location, and determining a location of the sensor corresponding to the largest extremum as the location of the disturbance.

5. The method of claim 1, further comprising, prior to the interpolating the extrema:
   triangulating locations of the sensors using a Delaunay triangulation approach;
   defining a region based on a geographic boundary of the sensors; and
   partitioning the region to form a mesh grid including a plurality of points.

6. The method of claim 5, wherein the interpolating the extrema comprises applying a bicubic two-dimensional interpolation to obtain the interpolated extrema at each of the plurality of points of the mesh grid.

7. A system, comprising:
   a power system;
   a plurality of sensors distributed across the power system; and
   a computer system including one or more processors, and memory storing instructions that when executed by the plurality of processors causes the plurality of processors to perform operations comprising:
   receiving data from the sensors;
   determining, for each sensor, an extremum of the data corresponding to the sensor;
   interpolating the extrema;
   determining a location corresponding to a global maximum of the interpolated extrema as a location of a disturbance in the power system; and
   modifying an operation of at least one element in the power system to mitigate an impact of the disturbance on the power system based on the location of the disturbance.

8. The system of claim 7, wherein the data is rate of change of frequency (ROCOF) data.

9. The system of claim 7, the operations further comprising, prior to the determining the extremum of the data, taking the absolute of the data.

10. The system of claim 7, the operations further comprising, prior to the interpolating the extrema:
    determining a largest extremum among the extrema;
    determining differences between the largest extremum and each of the remaining extrema; and
    if each of the differences is greater than a predetermined threshold, skipping the interpolating and the determining the location, and determining a location of the sensor corresponding to the largest extremum as the location of the disturbance.

11. The system of claim 7, the operations further comprising, prior to the interpolating the extrema:
    triangulating locations of the sensors using a Delaunay triangulation approach;
    defining a region based on a geographic boundary of the sensors; and
    partitioning the region to form a mesh grid including a plurality of points.

12. The system of claim 11, wherein the operations comprise applying a bicubic two-dimensional interpolation to obtain the interpolated extrema at each of the plurality of points of the mesh grid.

* * * * *

UNITED STATES PATENT AND TRADEMARK OFFICE
CERTIFICATE OF CORRECTION

PATENT NO. : 10,372,148 B2
APPLICATION NO. : 15/353341
DATED : August 6, 2019
INVENTOR(S) : You et al.

It is certified that error appears in the above-identified patent and that said Letters Patent is hereby corrected as shown below:

On the Title Page

Item (72) Inventors: Please correct "Shutang You, Knoxville, TX" to read -- Shutang You, Knoxville, TN --

In the Specification

Column 4, Line 57: Please correct "threshold c" to read -- threshold $\varepsilon$ --

Signed and Sealed this
Twenty-sixth Day of November, 2019

Andrei Iancu
*Director of the United States Patent and Trademark Office*